No. 609,355. Patented Aug. 16, 1898.
J. R. KELLEY.
HOE.
(Application filed Feb. 28, 1898.)
(No Model.)
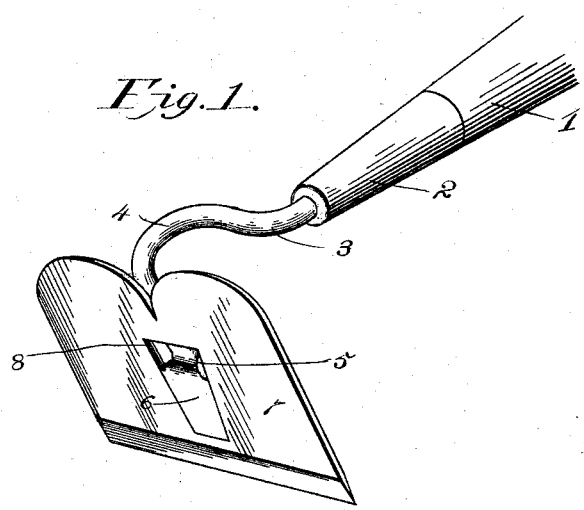
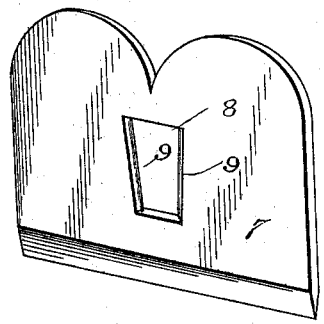
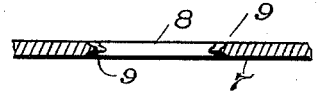
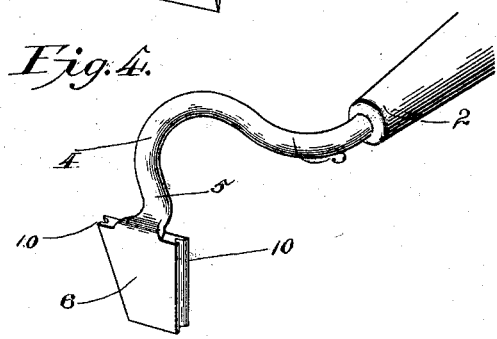
Inventor
John R. Kelley.

UNITED STATES PATENT OFFICE.

JOHN RILEY KELLEY, OF REELFOOT, TENNESSEE.

HOE.

SPECIFICATION forming part of Letters Patent No. 609,355, dated August 16, 1898.

Application filed February 26, 1898. Serial No. 671,829. (No model.)

*To all whom it may concern:*

Be it known that I, JOHN RILEY KELLEY, a citizen of the United States, residing at Reelfoot, in the county of Lake and State of Tennessee, have invented certain new and useful Improvements in Hoes; and I do hereby declare the following to be a full, clear, and exact description of the invention, such as will enable others skilled in the art to which it appertains to make and use the same.

My invention relates to a novel hoe, and has for its object the production of a simple, durable, and efficient device of this character comprising a handle having a shank, to which the blade or hoe proper may be readily attached without the necessity for the employment of locking mechanism separate from the elements named.

To the accomplishment of this general object and others subordinate thereto my invention consists in providing a shank of novel form with a socket for the reception of the handle and with a wedge-shaped locking-plate constituting one extremity of the shank and designed to be received by a correlatively-shaped opening in the hoe or blade, the construction of the interfitting members being such that the hoe is attached or detached by a slight lateral movement with respect to the shank, but will be securely held and will not be deranged by the violent shock incident to the ordinary manipulation of the tool.

Referring to the drawings, Figure 1 is a perspective view of my hoe complete. Fig. 2 is a detail view of the blade. Fig. 3 is a central transverse section through the subject-matter of Fig. 2, and Fig. 4 is a detail perspective view of the shank.

Referring to the numerals on the drawings, 1 indicates the handle of my tool, one end of which fits into a socket 2, constituting one terminal of the shank 3, bent upwardly somewhat abruptly, as indicated at 4, and having an offset 5, from the extremity of which extends in a plane substantially at right angles to the socket what may be termed a "locking-plate" 6, which is preferably about the thickness of the blade and is of wedge shape, as illustrated.

7 indicates the blade, which may be of any desired configuration, but is provided, preferably at or about its center, with a somewhat elongated inclined aperture 8, correlative in size and shape with the locking-plate 6, which is designed to be received by it. 9 indicates a wedge-shaped rib extending along each side of the aperture 8 and designed to be received within a similarly-inclined longitudinal recess 10, formed in each side edge of the locking-plate 6.

To apply the blade to the shank, the plate 6 is inserted into the upper part of the aperture 8, which latter being of greater dimensions than said plate will permit of its ready insertion. A slight blow is then applied to the cutting edge of the blade 7, which forces said blade upwardly, causing the rib 9 to fit within the recess 10 in the plate 6, clamping the two parts of the hoe rigidly and securely together. To disconnect these parts, a light blow is applied to the upper end of the blade or that end opposite its cutting edge.

The construction illustrated and described is believed to be preferable, and it is obvious that while the blade may be readily attached or detached for the purpose, for instance, of securing blades of various designs for different uses, it will be impossible to detach the blade or otherwise derange the parts by any shock incident to the usual manipulation of the plate. I do not desire, however, to limit myself to the details of construction herein shown and described, but reserve the right to change, modify, or vary said details within the scope of my invention.

What I claim is—

1. In a device of the character described, the combination with a shank, and a wedge-shaped locking-plate, of a blade provided with an inclined-sided aperture designed for the reception of said plate, substantially as specified.

2. The combination with a shank provided with a wedge-shaped locking-plate, of a blade provided with an inclined-sided aperture designed for the reception of said blade and coöperating locking mechanism carried by the plate and blade, substantially as specified.

3. In a device of the character described, the combination with a shank provided with a wedge-shaped locking-plate having grooves along its side edges, of a blade provided with an inclined-sided aperture for the reception of the blade, and with ribs along the side edge of the aperture and designed to be received within the grooves in the locking-plate.

4. In a device of the character described, the combination with a shank provided with a locking-plate extending substantially at right angles to the socket of said shank, and having longitudinal grooves along its side edges, of a blade provided with an inclined-sided transverse aperture designed for the reception of the locking-plate and having transversely wedge-shaped ribs along the side edges of said aperture and designed to be received within the grooves in the locking-plate, substantially as specified.

In testimony whereof I affix my signature in presence of two witnesses.

JOHN RILEY KELLEY.

Witnesses:
REUBEN T. ANDERSON,
MAMIE E. GRAY.